US012762851B2

(12) United States Patent
Ach et al.

(10) Patent No.: US 12,762,851 B2
(45) Date of Patent: Oct. 13, 2026

(54) LiDAR-CAMERA SPATIO-TEMPORAL ALIGNMENT USING NEURAL RADIANCE FIELDS

(71) Applicant: QUALCOMM Incorporated, San Diego, CA (US)

(72) Inventors: Nirnai Ach, Munich (DE); Mireille Lucette Laure Gregoire, Stuttgart (DE); Julia Kabalar, Munich (DE); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 18/314,607

(22) Filed: May 9, 2023

(65) Prior Publication Data

US 2024/0378872 A1 Nov. 14, 2024

(51) Int. Cl.

| | |
|---|---|
| ***G06V 10/80*** | (2022.01) |
| ***G01C 21/16*** | (2006.01) |
| ***G06V 10/774*** | (2022.01) |
| ***G06V 10/82*** | (2022.01) |
| ***G06V 20/58*** | (2022.01) |

(52) U.S. Cl.

CPC ....... *G06V 10/803* (2022.01); *G01C 21/1652* (2020.08); *G06V 10/774* (2022.01); *G06V 10/82* (2022.01); *G06V 20/58* (2022.01)

(58) Field of Classification Search

CPC .. G01S 17/89; G06T 7/20; G06N 3/08; G06F 18/21

See application file for complete search history.

(56) References Cited

U.S. PATENT DOCUMENTS

| | | | |
|---|---|---|---|
| 10,328,934 | B2 | 6/2019 | Minster |
| 10,999,511 | B2 | 5/2021 | Yang et al. |
| 11,506,500 | B2 | 11/2022 | Zhang et al. |

FOREIGN PATENT DOCUMENTS

| | | | | |
|---|---|---|---|---|
| DE | 102021002798 | A1 | 7/2021 | |
| WO | WO-2022182421 | A1 | 9/2022 | |
| WO | WO-2024179658 | A1 * | 9/2024 | ............... G06T 7/80 |

OTHER PUBLICATIONS

Herau, Quentin, et al. "Moisst: Multimodal optimization of implicit scene for spatiotemporal calibration." 2023 IEEE/RSJ International Conference on Intelligent Robots and Systems (IROS). IEEE, 2023. (Year: 2023).*

(Continued)

*Primary Examiner* — Ross Varndell

(74) *Attorney, Agent, or Firm* — Norton Rose Fulbright US LLP/QUALCOMM Incorporated

(57) ABSTRACT

This disclosure provides systems, methods, and devices for vehicle driving assistance systems that support image processing. In a first aspect, a method of image processing includes receiving first kinematic information associated with a camera image sensor; receiving, by the processor, point cloud data from a light detection and ranging (LiDAR) sensor; generating, by the processor, first image data that is time-synchronized with the point cloud data based on the first kinematic information and a neural radiance fields (NeRF) model; and generating, by the processor, fused data that combines the first image data and the point cloud data. Other aspects and features are also claimed and described.

15 Claims, 6 Drawing Sheets

(56) References Cited

OTHER PUBLICATIONS

Carlson, Alexandra, et al. "Cloner: Camera-lidar fusion for occupancy grid-aided neural representations." IEEE Robotics and Automation Letters 8.5 (2023): 2812-2819. (Year: 2023).*
Li, Zhengqi, et al. "Neural scene flow fields for space-time view synthesis of dynamic scenes." Proceedings of the IEEE/CVF conference on computer vision and pattern recognition. 2021. (Year: 2021).*
Yang, Wen, et al. "Lidar with velocity: Correcting moving objects point cloud distortion from oscillating scanning lidars by fusion with camera." IEEE Robotics and Automation Letters 7.3 (2022): 8241-8248. (Year: 2022).*
International Search Report and Written Opinion—PCT/US2024/017684—ISA/EPO—Sep. 10, 2024.
Pumarola A., et al., "D-NeRF: Neural Radiance Fields for Dynamic Scenes", arXiv:2011.13961v1 [cs.CV], 2021 IEEE/CVF Conference on Computer Vision and Pattern Recognition (CVPR), Nov. 27, 2020, pp. 1-10, XP055952085, Sections 1-5.
Zhang T., et al., "A Portable Multiscopic Camera for Novel View and Time Synthesis in Dynamic Scenes", 2022 IEEE/RSJ International Conference on Intelligent Robots and Systems (IROS), IEEE, Oct. 3, 2022, pp. 2409-2416, XP034257311, abstract, Sections I-IV.
Cheng T-Y., "A Very Basic Overview of Neural Radiance Fields (NeRF)", Jul. 31, 2022, 7 Pages.
Carlson A., et al., "CLONeR: Camera-Lidar Fusion for Occupancy Grid-Aided Neural Representations", Arxiv.Org, Cornell University Library, 201 Olin Library Cornell University Ithaca, NY 14853, arXiv:2209.01194v4 [cs.CV], Apr. 4, 2023, XP091475272, pp. 1-8, Sections I-IV.
Kim H., et al., "Visual-Inertial Odometry Priors for Bundle-Adjusting Neural Radiance Fields", 2022 22nd, International Conference on Control, Automation and Systems (ICCAS), ICROS, Nov. 27, 2022, pp. 1131-1136, XP034268769, Sections I-IV.
Partial International Search Report—PCT/US2024/017684—ISA/EPO—May 21, 2024.
Shi Y., et al., "Grid-Centric Traffic Scenario Perception for Autonomous Driving: A Comprehensive Review", Arxiv.Org, Cornell University Library, 201 Olin Library Cornell University Ithaca, NY 14853, arXiv:2303.01212v1 [cs.CV], Mar. 2, 2023, XP091450669, pp. 1-26, Sections III.A, III.B, IV.B, V, VI.A-VI.C, figures 5,12.

* cited by examiner

LiDAR-CAMERA SPATIO-TEMPORAL ALIGNMENT USING NEURAL RADIANCE FIELDS

TECHNICAL FIELD

Aspects of the present disclosure relate generally to driver-operated or driver-assisted vehicles or machines, and more particularly, to methods and systems suitable for supplying driving assistance, for autonomous driving, or for robotics.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection. Various driving, or movement, assistance systems have also been produced in machine automation generally, such as in robotics.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure provide improved systems for assisting drivers in vehicles with enhanced situational awareness when driving on a road. Aspects of this disclosure also provide improved datasets for training machine learning models that improve the machine learning models' object recognition and scene analysis, which benefits driver assistance systems as well as other vehicle systems and non-vehicle systems (e.g., robotics).

Example embodiments provide improved spatio-temporal alignment of light detection and ranging (LiDAR) output point cloud data and camera output image data. The collection of point cloud data and image data may be misaligned geometrically and/or spatially resulting from the arrangement of data capture equipment and separate electronic systems collecting and recording the data. The provided methods involve applying a neural radiance fields (NeRF) model to some of the data to reduce geometric and/or spatial misalignment. For example, camera image data at a particular camera pose may be simulated using a neural radiance fields (NeRF) model trained on a set of camera images of a scene that are each captured with the camera at different poses relative to the scene. Stated differently, a camera pose is input into the trained NeRF model, which then outputs image data that simulates the image data that would be captured if the camera were to have captured an image at the input camera pose. The simulated camera image that is output by the NeRF model is aligned spatially and/or temporally with corresponding LiDAR output data. The camera pose is extracted or generated from kinematic information, which may be output from a suitable egomotion system (e.g., an inertial navigation system, vehicle odometry, visual odometry, etc.).

A camera LiDAR fusion system fuses the camera image output from the NeRF model and the LiDAR point cloud data. The fused output may then be used in any suitable way that benefits from fused camera and LiDAR data with improved spatio-temporal alignment. For example, a machine learning model's performance is only as good as the data on which the machine learning model is trained. The fused output may be included in a dataset that is used to train a machine learning model, such as a machine learning model for a vehicle assistance system. Training the machine learning model with the more accurate fused output data improves the machine learning model's performance for object recognition or other scene analysis, such as identifying traffic lights or street signs, tracking vehicles or pedestrians on a road, or identifying obstructions on a road by improving the geometric and/or temporal alignment of the data used to train the model to recognize objects. Additionally, the provided methods enable simulating large datasets to train the machine learning model when data to train the machine learning model may be otherwise difficult to obtain. In another example, an online implementation involves training a database of NeRF models for a plurality of scenes such that a vehicle in operation driving through those same plurality of scenes (or a robot operating within the same plurality of scenes) can rely upon the provided methods for improved object recognition or other scene analysis.

Additional processing may be applied before or after the NeRF interpolation to further improve the fused output for particular applications. In some embodiments, kinematic information output from the suitable egomotion system alters the LiDAR point cloud data to generate motion compensated point cloud data. A pose of the LiDAR system is extracted or generated from the kinematic information that alters the LiDAR point cloud data. In some embodiments, artifacts are removed from the camera image output from the NeRF model prior to fusion.

While the present techniques are primarily described for use in a vehicle assistance system, one having ordinary skill in the art will appreciate how the present techniques can be implemented with other machine control-assistance systems or automation systems generally. For example, the present techniques may be implemented with various robotic systems to improve the control-assistance system or automation system of the robotic system.

In one aspect of the disclosure, a method for image processing for use in a vehicle assistance system, comprises: receiving, by a processor, first kinematic information associated with an image sensor of a camera; receiving, by the processor, point cloud data from a light detection and ranging (LiDAR) sensor; generating, by the processor, first image data that is time-synchronized with the point cloud data based on the first kinematic information and a neural radiance fields (NeRF) model; and generating, by the processor, fused data that combines the image data and the point cloud data.

In an additional aspect of the disclosure, an apparatus includes at least one processor and a memory coupled to the at least one processor. The at least one processor is configured to perform operations including: receiving first kinematic information associated with an image sensor of a camera; receiving point cloud data from a light detection and ranging (LiDAR) sensor; generating first image data that is time-synchronized with the point cloud data based on the first kinematic information and a neural radiance fields (NeRF) model; and generating fused data that combines the first image data and the point cloud data.

In an additional aspect of the disclosure, a method for training a model for use in a vehicle assistance system, comprises: receiving, by a processor, a plurality of images representing a scene; receiving, by the processor, pose information of at least one camera, wherein each image of the plurality of images is associated with a respective pose of the pose information of the at least one camera; and training, by the processor, a neural radiance fields (NeRF) model, based on the plurality of images and the pose information, to learn a three-dimensional geometric structure of the scene, wherein based on the three-dimensional geometric structure of the scene, the NeRF model as trained is configured to generate an output image that is temporally shifted compared to the plurality of images when input a pose of a camera.

In an additional aspect of the disclosure, an apparatus includes at least one processor and a memory coupled to the at least one processor. The at least one processor is configured to perform operations including: receiving, a plurality of images representing a scene; receiving pose information of at least one camera, wherein each image of the plurality of images is associated with a respective pose of the pose information of the at least one camera; and training a neural radiance fields (NeRF) model, based on the plurality of images and the pose information, to learn a three-dimensional geometric structure of the scene, wherein based on the three-dimensional geometric structure of the scene, the NeRF model as trained is configured to generate an output image that is temporally shifted compared to the plurality of images when input a pose of a camera.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
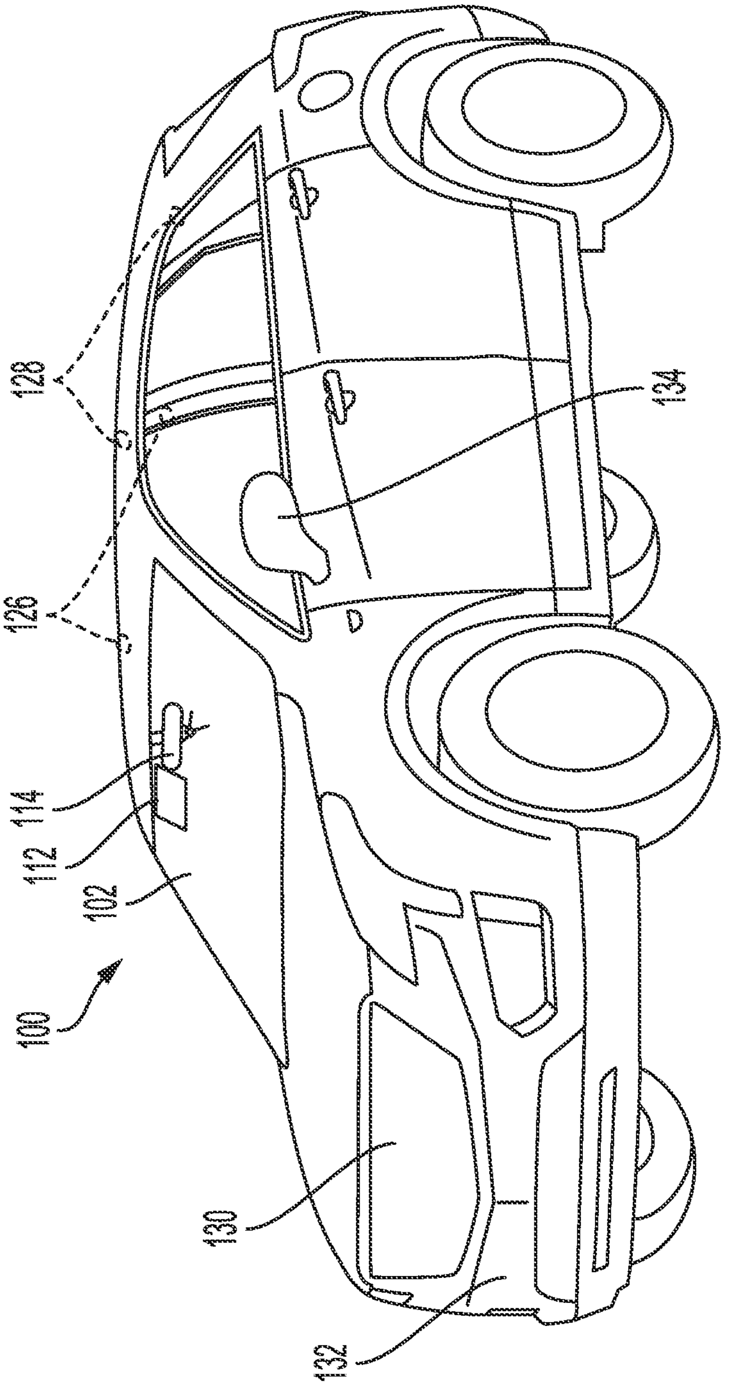
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support improved spatio-temporal alignment of light detection and ranging (LiDAR) output point cloud data and camera output image data, such as for driving assistance systems or autonomous vehicles. Spatially and temporally aligning the LiDAR point cloud data and camera image data is done at least in part by inputting a camera pose into a trained NeRF model, which then outputs image data that simulates the image data that would be captured if the camera were to capture an image at the input camera pose. The NeRF model is trained to learn the underlying geometric structure of a scene from a set of camera images and poses at which each image of the set of camera images was captured by the camera such that, upon a camera pose relative to the scene being input into the NeRF model, the NeRF model outputs simulated image data that would have captured had the camera captured image data at the input camera pose. If the input camera pose is aligned spatially and temporally with the LiDAR output data, then the NeRF model outputs camera image data that is aligned spatially and temporally with LiDAR output data. A pose of the camera is extracted or generated from kinematic information, which may be output from a suitable egomotion system (e.g., an inertial navigation system, vehicle odometry, visual odometry, etc.).

A camera LiDAR fusion system fuses the camera image output from the NeRF model and the LiDAR point cloud data. For instance, the range information from the LiDAR point cloud data may be projected into the camera image or the color information from the camera image may be projected into the LiDAR point cloud data. In an example use case, the fused data may be displayed or may be included in a dataset that is used to train a machine learning model (e.g., deep learning model), such as a machine learning model used for driving assistance systems. The provided methods enable larger and/or more accurate datasets for training the machine learning model by simulating images of a scene at any camera pose. In another example use case, the fused data may be used to control a vehicle (or robot). In some embodiments, kinematic information output from the ego-motion system may alter the LiDAR point cloud data to compensate for the motion of the LiDAR system. For instance, a pose of the LiDAR system (e.g., sensor) extracted or generated from the kinematic information may alter the LiDAR point cloud data. In some embodiments, motion artifacts are removed from the camera image output from the NeRF model prior to fusion.

As used herein, the term "pose" represents the position and orientation of an object, in three dimensions, relative to a reference. For example, a pose of a camera is the position and orientation of the camera relative to a scene when the camera captured an image of the scene. In another example, a pose of the LiDAR system, or of the sensor of the LiDAR system specifically, is the position and orientation of the LiDAR system, or sensor of the LiDAR system specifically, relative to a scene when the LiDAR system captured point cloud data of the scene.

Particular implementations of the subject matter described in this disclosure may be implemented to realize one or more of the following potential advantages or benefits. In some aspects, the present disclosure provides techniques for image processing that may be particularly beneficial in smart vehicle applications. For example, the present techniques can reduce the time synchronization burden between sensors of a vehicle. For instance, the present techniques can combine camera image data and LiDAR point cloud data without the need for accurate time synchronization between the camera and other sensors. In another example, the present techniques avoid complicated post-processing algorithms that depend on calibration, static-dynamic separation, object detection, and object tracking. Additionally, image data from a camera is typically captured at a higher frequency than point cloud data from LiDAR due to a shutter speed of the camera typically being faster than the LiDAR system, which results in less motion artifact removal from the camera image data as compared to interpolating the point cloud data. In another example, the present techniques can be used to isolate calibration errors for evaluation purposes.

In another example, the present techniques can be used to emulate different camera configurations on the vehicle, which can be used to transfer datasets between two physical setups. For example, in a broad respect, the present techniques postprocess unsynchronized collected data by generating synthetic camera images as if they were captured synchronized with the LiDAR. To do so, a camera pose is input into a NeRF model which indicates to the NeRF model where in space the camera would have been when the LiDAR system captured point cloud data of a scene, and the NeRF model outputs an image that simulates an image taken from that pose with the camera. In some instances, a sensor setup for collecting data may include one camera and one LiDAR system. In other instances, another suitable quantity of cameras could be used in the sensor setup. For example, the sensor setup may include two cameras and one LiDAR system. In such an example, images of the two cameras can be generated by training the NeRF model with the unsynchronized data collected from one camera and then inputting poses of each of the two cameras into the NeRF model so that the NeRF model outputs a respective image for each of the cameras that simulates respective images taken from the respective poses of each of the two cameras. In this way, a dataset captured with a first sensor setup (e.g., sensor set up with one camera) can be transferred, or converted, as if it were a dataset captured with a second sensor setup (e.g., sensor set up with two cameras).

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference to a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. Each of the cameras 112 and 114 may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame is further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
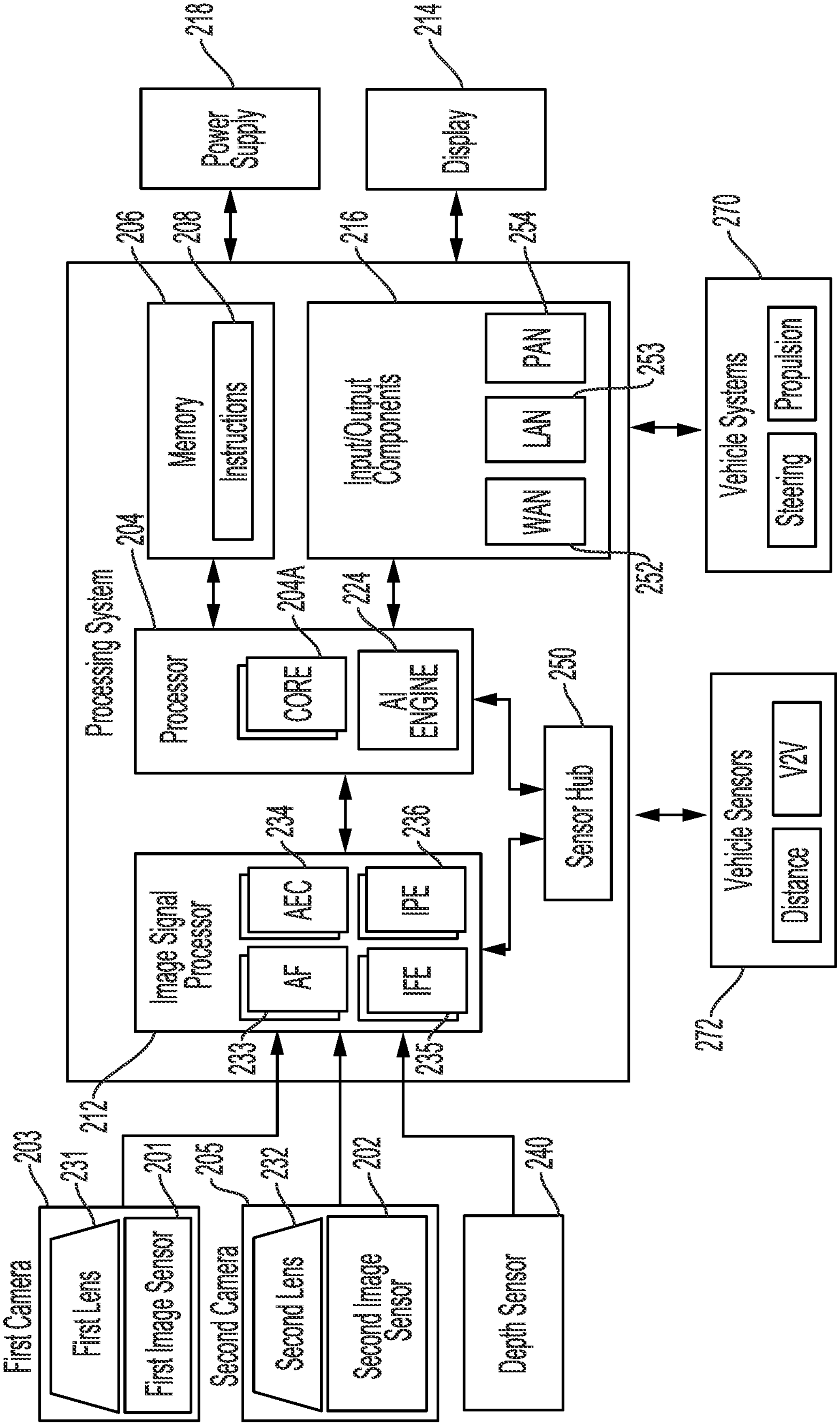
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The vehicle 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and/or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The sensor hub 250 may be part of a suitable egomotion system, such as an inertial navigation system (INS) that uses motion sensors (e.g., accelerometers), rotation sensors (e.g., gyroscopes) and a processing device to calculate by dead reckoning, or other techniques, the position, the orientation, and the velocity (direction and speed of movement) of a moving object (e.g., a camera on a car) without the need for external references. In some aspects, the inertial navigation system may include magnetic sensors (e.g., magnetometers) and/or speed measuring devices, or other suitable sensors/devices.

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensors 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjusts the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames.

Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) used to execute operations to cause the vehicle 100 to perform the operations described herein. For example, AI engine 224 may execute a neural radiance fields (NeRF) model for simulating image at a particular camera pose to obtain image data that has improved geometrical or temporal alignment with LiDAR point cloud data received as input from depth sensor 240 and/or from sensor hub 250. In another example, the processor core 204A may execute operations to simulate image data alone or in combination with the AI engine 224. The operation of the NeRF model may be based on a trained model stored in the memory 206. The trained model may be received through a network connection, such as WAN 252, LAN 253, and/or PAN 254. In some embodiments, the processor 204 performs training of the NeRF model based on training data stored in memory 206, which may be captured by components coupled to the processing system or received through a network connection, such as WAN 252, LAN 253, and/or PAN 254. The training data includes a plurality of images of a scene captured at a plurality of poses of a camera.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
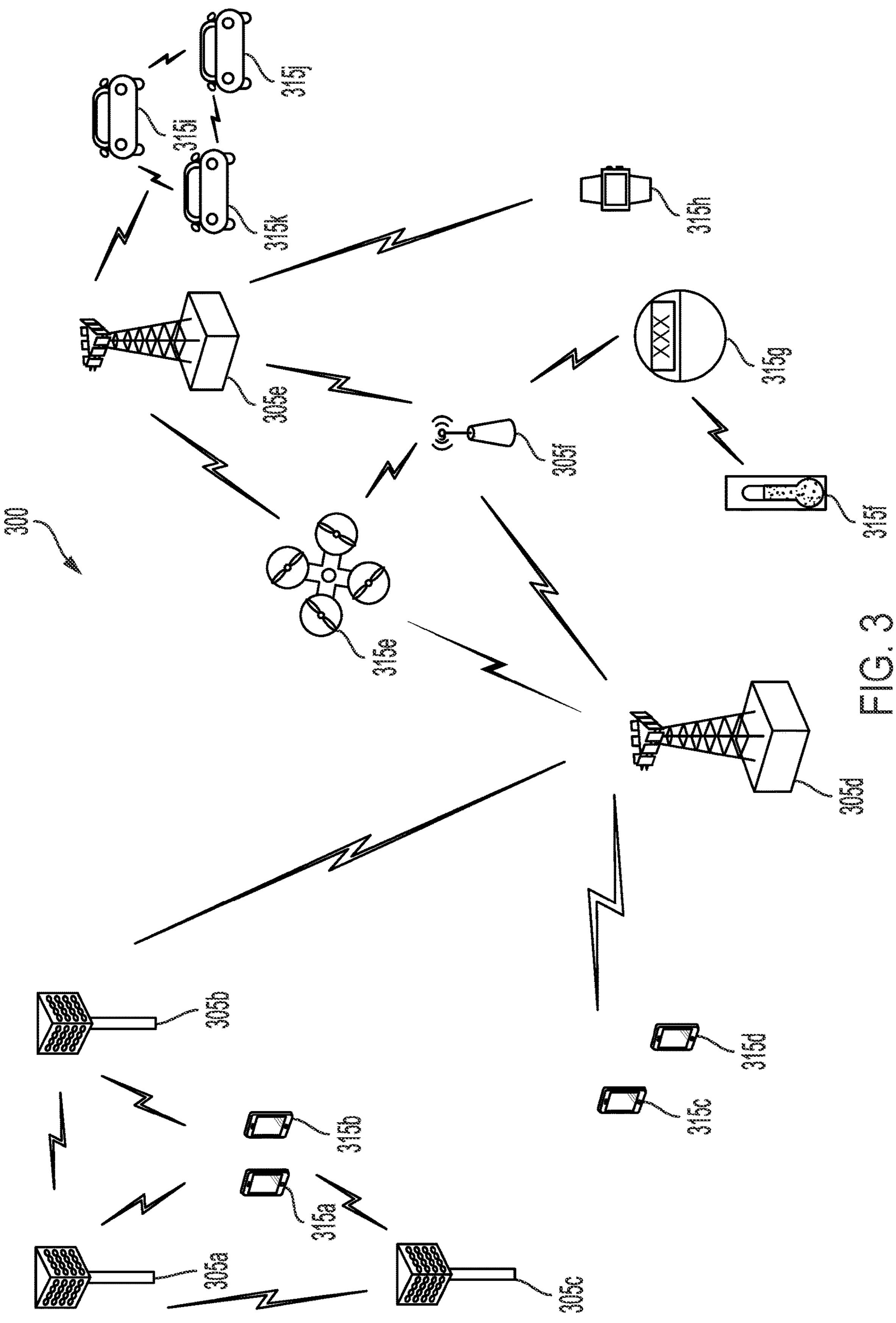
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network.

As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations **305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305*f*** is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs **315*a*-*j* are specifically shown as vehicles, a vehicle may employ the communication configuration described with reference to any of the UEs 315*a*-315*k***.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs **315*a*-315*d* of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315*c*-315*k* illustrated in FIG. 3 are examples of various machines configured for communication that access wireless network 300**.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations **305*a*-305*c* serve UEs 315*a* and 315*b* using 3D beamforming and coordinated spatial techniques, such as coordinated multipoint (CoMP) or multi-connectivity. Macro base station 305*d* performs backhaul communications with base stations 305*a*-305*c*, as well as small cell, base station 305*f*. Macro base station 305*d* also transmits multicast services which are subscribed to and received by UEs 315*c* and 315*d***. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315*e*, which is a drone. Redundant communication links with UE 315*e* include from macro base stations 305*d* and 305*e*, as well as small cell base station 305*f*. Other machine type devices, such as UE 315*f* (thermometer), UE 315*g* (smart meter), and UE 315*h* (wearable device) may communicate through wireless network 300 either directly with base stations, such as small cell base station 305*f*, and macro base station 305*e*, or in multi-hop configurations by communicating with another user device which relays its information to the network, such as UE 315*f* communicating temperature measurement information to the smart meter, UE 315*g*, which is then reported to the network through small cell base station 305*f*. Wireless network 300 may also provide additional network efficiency through dynamic, low-latency TDD communications or low-latency FDD communications, such as in a vehicle-to-vehicle (V2V) mesh network between UEs 315*i*-315*k* communicating with macro base station 305*c*.

Aspects of the vehicular systems described with reference to, and shown in, FIG. 1, FIG. 2, and FIG. 3 may include improved spatio-temporal alignment of light detection and ranging (LiDAR) output point cloud data and camera output image data in fused image data. For instance, the improved fused image data may be included in a dataset that is used to train a machine learning model for a machine control-assistance system or automation system, such as for driving assistance systems or autonomous vehicles. Spatially and temporally aligning the LiDAR point cloud data and camera image data is done at least in part by simulating camera image data at a particular camera pose using a trained neural radiance fields (NeRF) model. Stated differently, a camera pose is input into the trained NeRF model, which then outputs image data that simulates the image data that would be captured if the camera were to have captured an image at the input camera pose.

Figure 4:
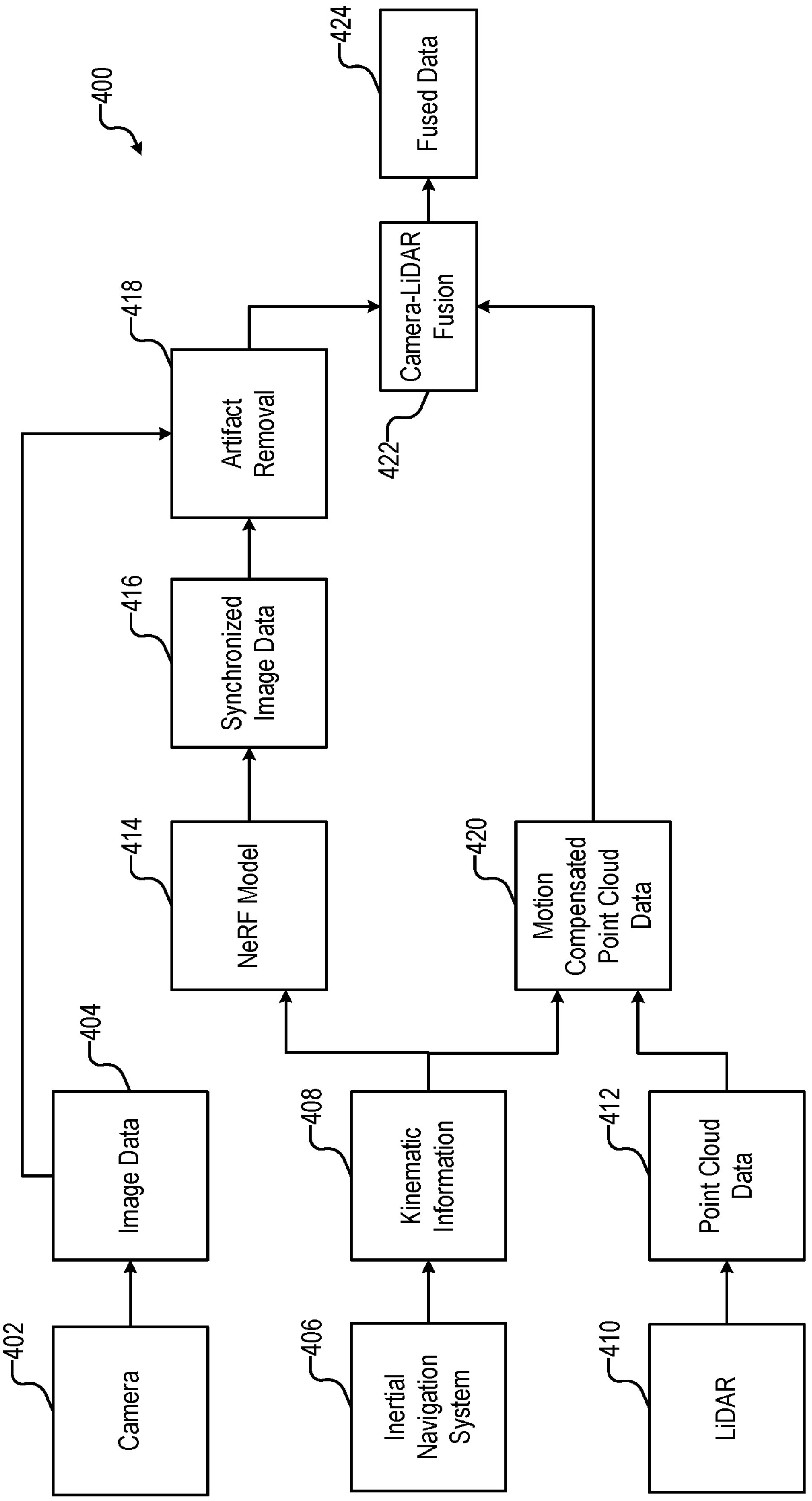
FIG. 4 is a block diagram illustrating a process for fusing camera output data with LiDAR output data according to one or more aspects of the disclosure.

FIG. 4 is a block diagram illustrating a process 400 for fusing camera output data with LiDAR output data. The process 400 is usable in any of the devices shown in the network of FIG. 3, including mobile devices with cameras and automobiles 315*i-k*. Additional examples are described for image processing operations to support operation of vehicles 315*i-k*, but the embodiments described herein may be performed by other devices or to the benefit of other devices, whether mobile or fixed. The image analysis of the process 400 can be performed on a cloud server coupled to the vehicles 315*i-k* through one of the network nodes 305*a-f*. In some embodiments, the image analysis of the process 400 can be performed on one of the base stations 305*a-f*. In some embodiments, the image analysis of process 400 can be performed on any one of the devices of the network in FIG. 3 that is separate from the vehicle.

The process 400 may begin at block 402 in which a camera captures a sequence of images representing a scene, such as a scene in front of a car. The sequence of images are depicted as image data in block 404. The sequence of images can be used for artifact removal as described in connection with block 418 and/or can be used to train a NeRF model for future processing. At block 406, an egomotion system, such as an inertial navigation system, captures position and orientation information associated with the camera and/or the LiDAR system. In some aspects, GPS satellite signals may be used to correct or calibrate an output from the inertial navigation system. The output of the inertial navigation system, which may be calibrated by GPS satellite signals, is depicted as kinematic information in block 408. The kinematic information is associated with the camera and/or the LiDAR system, and a pose of the camera or the LiDAR system may be extracted or generated from the kinematic information. For instance, a first subset of the kinematic information may be associated with the camera whereas a second subset of the kinematic information may be associated with the LiDAR system. In some aspects, the kinematic information further includes time information, such as time points associated with the position and orientation information associated with the camera and/or the LiDAR system. In other aspects, the time information may be obtained from another suitable source (e.g., a computing system of a vehicle). As described, a camera captures image data at a different time point than the LiDAR system captures point cloud data due to their different capture rates.

At block 410, a LiDAR system captures point cloud data representing the scene, such as the scene in front of a vehicle. As is known in the art, a LiDAR system is a ranging device, which measures the distance to a target. The distance is measured by sending a short laser pulse and recording the time lapse between the outgoing light pulse and the detection of the reflected (back-scattered) light pulse. A LiDAR system may use a scan mirror, multiple laser beams, or other means to "scan" the object space. For instance, when used with vehicles, LiDAR systems can be used to create a three-dimensional model of a dynamic scene that is encountered by a driving vehicle, which can be done in various ways, such as by using a scanning technique. The point cloud data captured by the LiDAR system is depicted in block 412.

At block 414, kinematic information associated with the camera (e.g., a pose of the camera) is input into a NeRF model trained on image data and kinematic information associated with the image data. The camera pose input into the NeRF model is determined based on the kinematic information of block 408. For instance, a pose of the camera relative to a pose of the LiDAR system is known because the camera and the LiDAR system are fixed relative to one another. Based on the pose associated with the camera at block 408, a first time point at which the camera captured image data at block 404, a second time point at which the LiDAR system captured point cloud data at block 412, the known pose of the camera relative to the pose of the LiDAR system, and a velocity of an object in the scene or of the camera and LiDAR system, the pose the camera would have been at when the LiDAR system captured the point cloud data at the second time point can be determined. For instance, if the camera and the LiDAR system are both stationary (e.g., a vehicle is stopped) and the scene is entirely stationary, then the image data being captured at a different time point than the point cloud data would not matter because the camera pose, LiDAR system pose, and scene would all be the same at both time points. Instead, if the camera and LiDAR system are moving relative to the scene (e.g., a vehicle driving) or objects in the scene are moving, then capturing the scene at two different time points would result in different viewpoints of the scene. As such, a synchronized camera pose is determined at which the camera would have been relative to the scene had the camera captured an image at the same second time point as the LiDAR point cloud data. This synchronized camera pose is included in the kinematic information associated with the camera that is input into the NeRF model. The NeRF model is trained to output image data that the camera would have captured had the camera captured image data at the synchronized camera pose. In this way, the output image data is aligned spatially and temporally with the point cloud data output from the LiDAR system. In some embodiments, the NeRF model includes multiple NeRF models that are each trained for a respective portion of fixed volume (e.g., 300×300×10 m) of the volume of the entire image dataset (e.g., image data of block 404) captured. In other embodiments, the NeRF model is a single NeRF model that is trained for the volume of the entire image dataset (e.g., image data of block 404) captured.

The output image data from the NeRF model is depicted as synchronized image data in block 416. In various embodiments, at block 418, motion artifacts are removed from the synchronized image data using known artifact removal processing techniques, which includes use of the image data of block 404.

At block 420, the point cloud data output from the LiDAR system is modified based on kinematic information associated with the LiDAR system (e.g., a pose of the LiDAR system or a sensor of the LiDAR system) in order to compensate for motion of the LiDAR system (e.g., due to the motion of a vehicle to which the LiDAR system is attached). For example, when a LiDAR sensor is mounted on a moving vehicle, the bumps the vehicle encounters can cause the laser beams that are emitted to be displaced from their intended locations. The point cloud data can be modified by changing a position of a plurality of points of the point cloud data based on the second kinematic information so as to reduce the effect of the motion that may have caused points to be at unintended positions. For instance, the correction to modify the position of each data point in the point cloud data that needs correction is estimated by using the egomotion system (e.g., inertial navigation system, vehicle odometry, visual odometry, etc.). The modified point cloud data is depicted as motion compensated point cloud data in block 420.

At block 422, the synchronized image data (with or without artifact removal) is combined, or fused, with the motion compensated point cloud data. The fusion may be accomplished with known camera-LiDAR fusion processing techniques. In the present method, fusing two different types of data (image data and point cloud data) leverages various camera-LiDAR sensor setups to enhance detection of an object in a scene compared to a single input source (e.g., a single camera). The output fused data may correspond to the fusion processing techniques that are applied. For instance, in some embodiments, the output fused data may be image data that is augmented by point cloud data. In other embodiments, the output fused data may be point cloud data that is augmented by image data. The output fused data is depicted in block 424.

In various embodiments, process 400 includes displaying the output fused data on a suitable display. In some embodiments, process 400 includes controlling a vehicle or other machine (e.g., robot) based on the output fused data. For example, the output fused data may be input to a driving assistance system that processes the fused data to control functions of the vehicle. In some embodiments, process 400 includes training a machine learning model (e.g., a deep learning model) with a dataset including the fused data. The machine learning model may be a machine learning model used for a vehicle assistance system.

Figure 5:
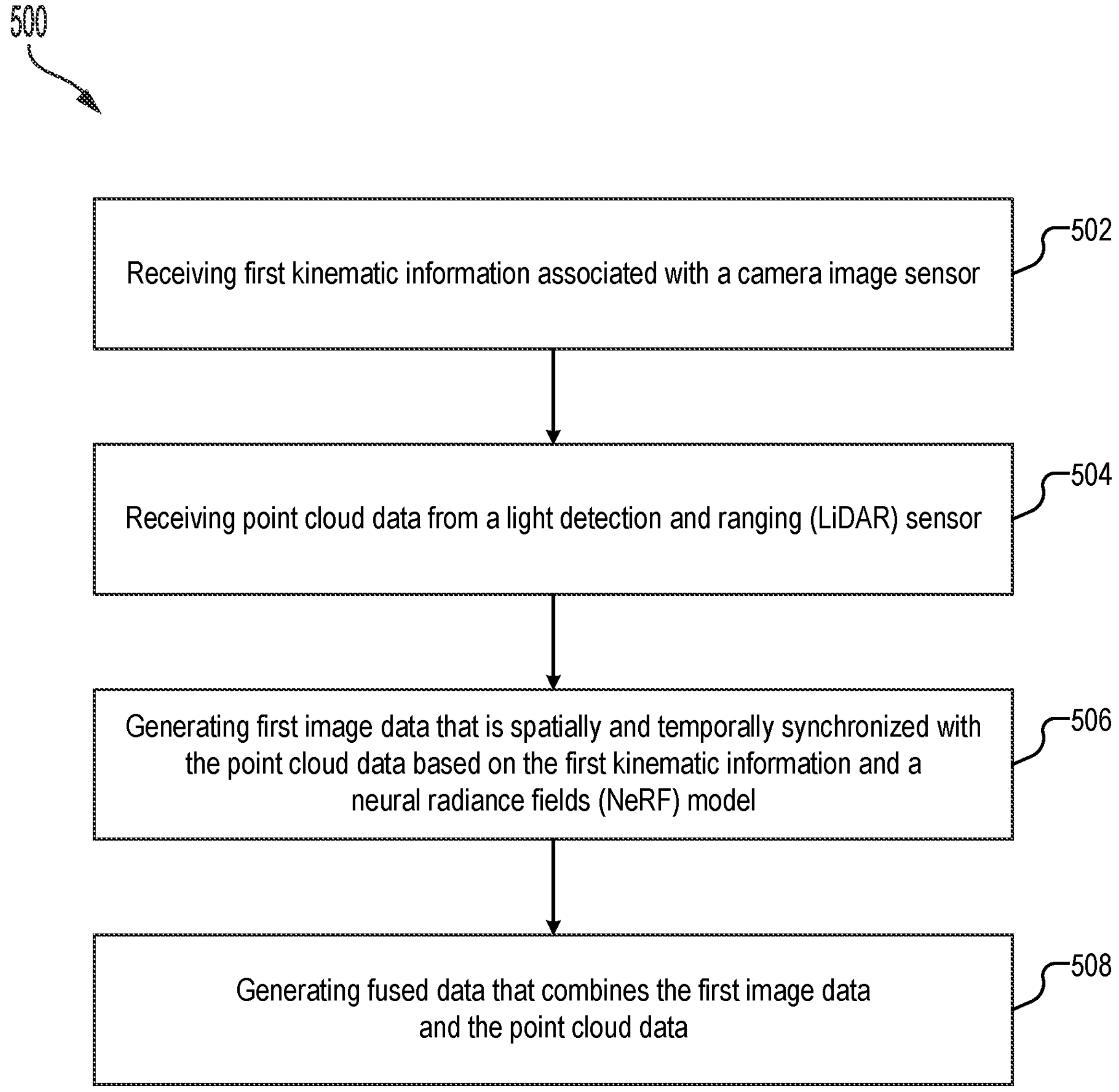
FIG. 5 is a flow chart illustrating an example method for fusing camera output data with LiDAR output data according to one or more aspects of the disclosure.

One method of performing image processing according to embodiments described above is shown in FIG. 5. FIG. 5 is a flow chart illustrating an example method 500 for fusing camera output data with LiDAR output data. The method 500 is usable in any of the devices shown in the network of FIG. 3. In examples of automotive applications, the image analysis of the method 500 can be performed in the cloud on any one of the devices of the network in FIG. 3 that is separate from the vehicle. The method 500 includes, at block 502, receiving first kinematic information associated with a camera image sensor. A pose of the camera image sensor is extracted or generated from the kinematic information associated with the camera image sensor. The first kinematic information associated with the camera image sensor may be received from an egomotion system (e.g., the inertial navigation system described at block 406). In some aspects, the first kinematic information of the inertial navigation system may be calibrated by GPS signals, as described above.

Example method 500 further includes receiving time information (e.g., a time point) corresponding to the first kinematic information. The time information can be received as part of the first kinematic information or separately from the first kinematic information. For instance, the time information may be received from a portion of a driving assistance system that tracks time. The time information can be received at the same time as the first kinematic information or subsequent or prior to the first kinematic information.

At block 504, point cloud data is received from a sensor of a LiDAR system. The point cloud data is representative of a scene in view of the LiDAR sensor. Successive point cloud data is received at a frequency corresponding to the scanner laser beam of the LiDAR system, which is a lower frequency than the frequency at which the camera is configured to capture successive images, which corresponds to a shutter speed of the camera. The received point cloud data is associated with a time point at which the LiDAR sensor captured the point cloud data. In some embodiments, second kinematic information associated with the sensor of the LiDAR system is received. In such embodiments, a pose of the sensor of the LiDAR system may be extracted or generated from the second kinematic information associated with the sensor of the LiDAR system. The second kinematic information associated with the LiDAR sensor may be received from an egomotion system (e.g., the inertial navigation system described at block 406). In some aspects, the second kinematic information of the inertial navigation system may be calibrated by GPS signals, as described above.

At block 506, first image data is generated that is spatially and temporally synchronized with the point cloud data based on the first kinematic information associated with the camera image sensor and a neural radiance fields (NeRF) model. A camera image sensor pose, at which the camera image sensor was at the time point when the LiDAR sensor captured the point cloud data (hereinafter referred to as a synchronized camera image sensor pose), is determined from the first kinematic information. The synchronized camera image sensor pose is input into the NeRF model, which generates the first image data as an output. The synchronized camera image sensor pose is determined based on a known relation between a pose of the camera image sensor and a pose of the LiDAR sensor, the first kinematic information (e.g., pose associated with the camera image sensor), the time point corresponding to the first kinematic information, the time point at which the LiDAR sensor captured the point cloud data, and a velocity of an object in the scene or of the camera image sensor and LiDAR sensor. The relation between the camera image sensor's pose and the LiDAR sensor's pose is known because the camera image sensor and the LiDAR sensor are fixed relative to one another (e.g., both the camera image sensor and LiDAR sensor are fixed on a vehicle). To illustrate the purpose of the synchronized camera image sensor pose, if the camera image sensor and the LiDAR sensor are both stationary (e.g., a vehicle is stopped) and the scene is entirely stationary, then the image data being captured at a different time point than the point cloud data would not matter because the camera image sensor pose, LiDAR sensor pose, and scene would all be the same at both time points. Instead, if the camera image sensor and LiDAR sensor are moving relative to the scene (e.g., a vehicle driving) or objects in the scene are moving, then capturing the scene as image data at one time point and as point cloud data at a different time point would result in fusing image data and point cloud data that are unaligned. As such, a synchronized camera pose is determined at which the camera would have been relative to the scene had the camera captured image data at the same time point as the LiDAR sensor captured the point cloud data. Inputting the synchronized camera image sensor pose into the NeRF model results in output image data that is spatially and temporally synchronized with the point cloud data.

The NeRF model is trained based on second image data of a scene and accompanying pose information of the camera that captured the second image data so that the NeRF model learns a three-dimensional geometric structure of the scene. For instance, the second image data includes image data of the scene captured with a camera at a variety of poses relative to the scene. Based on the image data at the various viewpoints of the scene and the camera poses at which the image data was captured, the NeRF model learns the three-dimensional geometric structure of the scene. With the NeRF model trained to recognize the three-dimensional geometric structure of the scene and associate different viewpoints of the scene with respective camera image sensor poses, when a pose is input into the NeRF model, the NeRF model outputs image data that simulates image data that would have been captured with the camera image sensor oriented in the pose input to the NeRF model. For example, the synchronized camera image sensor pose is determined from the first kinematic information associated with the camera image sensor, as described above. The synchronized camera image sensor pose is then input into the NeRF model which generates the first image data. The first image data is spatially and/or temporally synchronized with the point cloud data since the first image data simulates image data that would have been captured by the camera image sensor had the camera image sensor captured image data at the same time as the LiDAR sensor. In various instances, the first image data is spatially and/or temporally shifted compared to the second image data on which the NeRF model was trained. Stated differently, the NeRF model learns the three-dimensional geometric structure of the scene and can output a simulated image captured by the camera image sensor at any input pose, even if the data on which the NeRF model was trained did not include image data associated with a camera image sensor at a particular pose.

In some embodiments, the first image data is modified to remove artifacts (e.g., motion artifacts) from the first image data using known artifact removal processing techniques. The artifacts may be introduced into the first image data as a result of the simulation from the training data set executed by the NeRF model.

In some embodiments, the point cloud data is modified based on the second kinematic information associated with the sensor of the LiDAR system. The modification of the point cloud data compensates for the motion of the sensor of the LiDAR system.

At block 508, fused data is generated that combines the first image data and the point cloud data. For instance, the first image data and the point cloud data may be fused using known camera-LiDAR fusion processing techniques. In some embodiments, the fused data may be image data that is augmented by point cloud data. In other embodiments, the fused data may be point cloud data that is augmented by image data. In the embodiments in which the point cloud data is modified based on kinematic information, the first image data is fused with the modified point cloud data.

In one example implementation, the fused data is included in a dataset that is used to train a machine learning model, such as a machine learning model for a vehicle assistance system. A machine learning model's performance is only as good as the data with which the machine learning model is trained. Obtaining a sufficiently large and/or accurate dataset can be a challenge when training a machine learning model. The provided method enables creating larger training datasets by simulating images of a scene captured at any pose of a camera image sensor to generate the fused data. Training the machine learning model with the more accurate fused output data also improves the machine learning model's performance for object recognition or other scene analysis, such as identifying traffic lights or street signs, tracking vehicles or pedestrians on a road, or identifying obstructions on a road by improving the geometric and/or temporal alignment of the data used to train the model to recognize objects.

In another example implementation, the fused data is used as input to a machine control-assistance system or automation system, such as a robotics control system, an autonomous vehicle, or a vehicle with driving assistance systems. For example, a processor of the robot or vehicle may detect an object that is in front of the robot or vehicle based on the fused data. In response, the processor of the robot or vehicle may control the robot or vehicle based on that detected object. For example, the robot or vehicle may be controlled to avoid the object while the robot or vehicle is moving or to stop the robot or vehicle prior to colliding with the object. Since the NeRF model used to determine the fused data is trained on certain scenes, this example implementation is particularly useful for machines (e.g., robotics) that repeatedly see the same certain scenes on which the NeRF model is trained, though vehicles can be such machines in some instances. In exemplary embodiments, the trained NeRF model may be stored in memory on the robot or vehicle or may be stored in a remote server in communication with the robot or vehicle.

Figure 6:
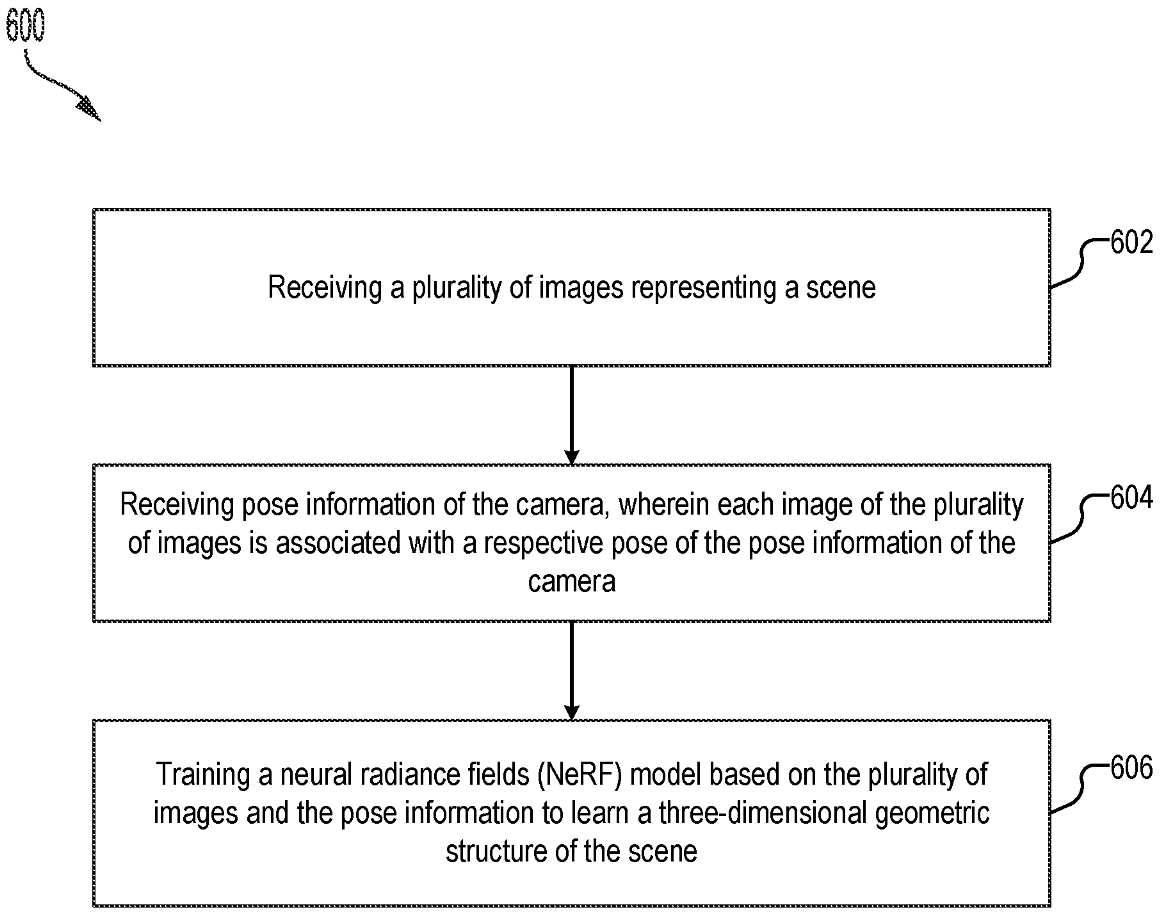
FIG. 6 is a flow chart illustrating an example method for training a neural radiance fields (NeRF) model according to one or more aspects of the disclosure.

FIG. 6 is a flow chart illustrating an example method 600 for training a NeRF model to output spatially and temporally shifted images compared to a training set of images. Method 600 includes, at block 602, receiving a plurality of images representing a scene. The plurality of images were captured by one or more camera image sensors. In some embodiments, the one or more camera image sensors are disposed on one or more vehicles such that the represented scene is a portion of the area surrounding the one or more vehicles. In an example implementation, a first camera image sensor is disposed on a first vehicle and a second camera image sensor is disposed on a second vehicle. At block 604, pose information of the one or more cameras is received. Each image of the plurality of images is associated with a respective pose of the pose information of the one or more cameras. Continuing the above example implementation, the first camera image sensor may capture a first image at a first pose with respect to a scene such that the first image is associated with the first pose, and the second camera image sensor may capture a second image at a second pose (different than the first pose) with respect to the scene such that the second image is associated with the second pose. In another example implementation, a single vehicle may be operated such that one or more image sensors disposed on the single vehicle captures images of a scene at multiple different poses relative to the scene. The pose information of the one or more cameras is based on output (e.g., kinematic information) from one or more egomotion systems (e.g., an inertial navigation system including a motion sensor and a rotation sensor). As described above, the output from the inertial navigation system may be calibrated by GPS signals At block 606, a neural radiance fields (NeRF) model is trained based on the plurality of images and the pose information to learn a three-dimensional geometric structure of the scene. Based on the three-dimensional geometric structure of the scene, the NeRF model as trained is configured to generate an output image, when input a pose of a camera, that is temporally shifted compared to the plurality of images on which the NeRF model is trained. In some aspects, the camera associated with the pose input into the NeRF model is the camera that captured at least some of the images on which the NeRF model was trained. In other aspects, the camera associated with the pose input into the NeRF model is a different camera that has a same fixed orientation as the camera that captured at least some of the images on which the NeRF model was trained The output image is temporally shifted such that the output image is time-synchronized with light detection and ranging (LiDAR) output data representing the scene. The output image may also be spatially shifted compared to the set of images such that the output image is spatially-synchronized with the LiDAR output data representing the scene.

Stated differently, each of a plurality of images of a scene are associated with a respective pose at which each of the images was captured and the NeRF model is trained on the various views of the scene, provided by the images of the scene at the different poses, to learn the underlying three-dimensional geometric structure of the scene. With the NeRF model trained on the underlying geometric structure of the scene, any pose can be input into the trained NeRF model and the trained NeRF model will output an image of the scene that would be captured with an image sensor oriented in the input pose relative to the scene. The output image, in at least some instances, is temporally shifted compared to the plurality of images on which the NeRF model was trained. For example, an image captured at a first point in time will look different than an image captured at a later point in time, even if by less than a second, if an object in the scene captured by the image is moving or if the image sensor capturing the scene is moving (e.g., a vehicle moving along a road). As stated above, a camera image sensor captures image data of a scene at a different time than a LiDAR sensor captures point cloud data of the scene. Because of the time difference, the NeRF model is trained to learn the underlying geometric structure of the scene so that the NeRF model can output an image that simulates an image that would have been captured with an image sensor oriented in the input pose at a point in time synchronized with the point in time at which the LiDAR sensor captured the point cloud data.

It is noted that one or more blocks (or operations) described with reference to FIGS. 5 and 6 may be combined with one or more blocks (or operations) described with reference to another of the figures. For example, one or more blocks (or operations) of FIGS. 5 and 6 may be combined with one or more blocks (or operations) of FIGS. 1-3. As another example, one or more blocks associated with FIGS. 5 and 6 may be combined with one or more blocks associated with FIG. 4.

In one or more aspects, techniques for supporting vehicular operations may include additional aspects, such as any single aspect or any combination of aspects described below or in connection with one or more other processes or devices described elsewhere herein. In a first aspect, an apparatus includes a memory storing processor-readable code; and at least one processor coupled to the memory, the at least one processor configured to execute the processor-readable code to cause the at least one processor to perform operations including: receiving, by a processor, first kinematic information associated with an image sensor of a camera; receiving, by the processor, point cloud data from a light detection and ranging (LiDAR) sensor; generating, by the processor, first image data that is time-synchronized with the point cloud data based on the first kinematic information and a neural radiance fields (NeRF) model; and generating, by the processor, fused data that combines the first image data and the point cloud data. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the operations further include determining a pose of the image sensor based on the first kinematic information. The point cloud data is captured by the LiDAR sensor at a first time point and the determined pose corresponds to the first time point. Generating the first image data includes inputting the pose into the NeRF model such that the NeRF model outputs the first image data.

In a third aspect, in combination with the second aspect, the first kinematic information is received from an inertial navigation system including a motion sensor and a rotation sensor.

In a fourth aspect, in combination with one or more of the first aspect through the third aspect, the operations further include receiving second kinematic information associated with the LiDAR sensor; and generating modified point cloud data based on the point cloud data and the second kinematic information.

In a fifth aspect, in combination with the fourth aspect, the fused data combines the first image data and the modified point cloud data.

In a sixth aspect, in combination with one or more of the first aspect through the fifth aspect, wherein generating the modified point cloud data includes modifying a position of a plurality of points of the point cloud data based on the second kinematic information.

In a seventh aspect, in combination with one or more of the first aspect through the sixth aspect, the NeRF model is trained on second image data that is not spatially or temporally synchronized with the point cloud data.

In an eighth aspect, in combination with one or more of the first aspect through the seventh aspect, the image sensor is configured to capture data at a higher frequency than the LiDAR sensor.

In a ninth aspect, in combination with one or more of the first aspect through the eighth aspect, the operations further include training a machine learning model with a dataset including the fused data.

In a tenth aspect, in combination with one or more of the first aspect through the ninth aspect, the operations further include detecting an object based on the fused data; and controlling a vehicle based on the object that is detected.

In an eleventh aspect, an apparatus includes a memory storing processor-readable code; and at least one processor coupled to the memory, the at least one processor configured to execute the processor-readable code to cause the at least one processor to perform operations including: receiving a plurality of images representing a scene; receiving pose information of at least one camera, wherein each image of the plurality of images is associated with a respective pose of the pose information of the at least one camera; and training a neural radiance fields (NeRF) model, based on the plurality of images and the pose information, to learn a three-dimensional geometric structure of the scene, wherein based on the three-dimensional geometric structure of the scene, the NeRF model as trained is configured to generate an output image that is temporally shifted compared to the plurality of images when input a pose of a camera.

In a twelfth aspect, in combination with the eleventh aspect, the output image is temporally shifted such that the output image is time-synchronized with light detection and ranging (LiDAR) output data representing the scene.

In a thirteenth aspect, in combination with the twelfth aspect, the output image is further spatially shifted compared to the plurality of images such that the output image is spatially-synchronized with the LiDAR output data representing the scene.

In a fourteenth aspect, in combination with one or more of the eleventh aspect through the thirteenth aspect, the plurality of images are received from an image sensor of the camera disposed on a vehicle.

In a fifteenth aspect, in combination with one or more of the eleventh aspect through the fourteenth aspect, the pose information of the camera is based on an output from an inertial navigation system including a motion sensor and a rotation sensor, and wherein the output from the inertial navigation system is calibrated by GPS signals.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for image processing, comprising: receiving, by a processor, first kinematic information associated with an image sensor of a camera;

receiving, by the processor, point cloud data from a light detection and ranging (LiDAR) sensor captured at a first time point;

receiving, by the processor, image data from the image sensor of the camera captured at a second time point that is different than the first time point;

determining, by the processor, a pose of the image sensor based on the first kinematic information, including the first time point, the second time point, and a velocity of an object in a field of view of the image sensor, wherein the pose corresponds to the first time point;

generating, by the processor, first image data that is time-synchronized with the point cloud data based on the first kinematic information and a neural radiance fields (NeRF) model, wherein generating the first image data includes inputting the pose into the NeRF model such that the NeRF model outputs the first image data, and wherein the first image data corresponds to the first time point;

performing, by the processor, artifact removal on the first image data based on the first image data and the image data captured at the second time point;

receiving, by the processor, second kinematic information associated with the LiDAR sensor;

generating, by the processor, modified point cloud data based on the point cloud data and the second kinematic information; and generating, by the processor, after performing the artifact removal on the first image data, fused data that combines the first image data and the modified point cloud data.

2. The method of claim 1, wherein the first kinematic information is received from an inertial navigation system including a motion sensor and a rotation sensor.

3. The method of claim 1, wherein generating the modified point cloud data includes modifying a position of a plurality of points of the point cloud data based on the second kinematic information.

4. The method of claim 1, wherein the NeRF model is trained on second image data that is not spatially or temporally synchronized with the point cloud data such that the NeRF model generates the first image data based on the first kinematic information.

5. The method of claim 1, wherein the image sensor is configured to capture data of a scene at a higher frequency than the LiDAR sensor is configured to capture data of the scene.

6. The method of claim 1, further comprising training a machine learning model with a dataset including the fused data.

7. The method of claim 1, further comprising:

detecting, with the processor, an object based on the fused data; and controlling, with the processor, a machine based on the object that is detected.

8. An apparatus, comprising:

a memory storing processor readable code; and at least one processor coupled to the memory, the at least one processor configured to execute the processor-readable code to cause the at least one processor to perform operations including:

receiving first kinematic information associated with an image sensor of a camera; receiving point cloud data from a light detection and ranging (LiDAR) sensor captured at a first time point;

receiving image data from the image sensor of the camera captured at a second time point that is different than the first time point;

determining a pose of the image sensor based on the first kinematic information, including the first time point, the second time point, and a velocity of an object in a field of view of the image sensor, wherein the pose corresponds to the first time point;

generating first image data that is time-synchronized with the point cloud data based on the first kinematic information and a neural radiance fields (NeRF) model, wherein generating the first image data includes inputting the pose into the NeRF model such that the NeRF model outputs the first image data, and wherein the first image data corresponds to the first time point;

performing artifact removal on the first image data based on the first image data and the image data captured at the second time point;

receiving second kinematic information associated with the LiDAR sensor;

generating modified point cloud data based on the point cloud data and the second kinematic information; and generating, after performing the artifact removal on the first image data, fused data that combines the first image data and the modified point cloud data.

9. The apparatus of claim 8, wherein the first kinematic information is received from an inertial navigation system including a motion sensor and a rotation sensor.

10. The apparatus of claim 8, wherein generating the modified point cloud data includes modifying a position of a plurality of points of the point cloud data based on the second kinematic information.

11. The apparatus of claim 8, wherein the NeRF model is trained on second image data that is not spatially or temporally synchronized with the point cloud data such that the NeRF model generates the first image data based on the first kinematic information.

12. The apparatus of claim 8, wherein the image sensor is configured to capture data at a higher frequency than the LiDAR sensor.

13. The apparatus of claim 8, wherein the operations further include training a machine learning model with a dataset including the fused data.

14. The apparatus of claim 8, wherein the operations further include:

detecting an object based on the fused data; and controlling a machine based on the object that is detected.

15. The method of claim 1, wherein the first image data is generated based only on the pose and the NeRF model.

* * * * *